(12) United States Patent
Doumeki et al.

(10) Patent No.: US 7,908,843 B2
(45) Date of Patent: Mar. 22, 2011

(54) EXHAUST GAS PURIFICATION DEVICE

(75) Inventors: Reiko Doumeki, Tokyo (JP); Yoshinaka Takeda, Tokyo (JP); Satoshi Hiranuma, Tokyo (JP); Ritsuko Shinozaki, Tokyo (JP); Shinichi Saitou, Tokyo (JP); Yasuko Suzuki, Tokyo (JP)

(73) Assignees: Mitsubishi Fuso Truck and Bus Corporation (JP); Nissan Diesel Motor Co., Ltd. (JP)

( * ) Notice: Subject to any disclaimer, the term of this patent is extended or adjusted under 35 U.S.C. 154(b) by 1050 days.

(21) Appl. No.: 11/566,655

(22) Filed: Dec. 4, 2006

(65) Prior Publication Data

US 2007/0160508 A1    Jul. 12, 2007

(30) Foreign Application Priority Data

Dec. 9, 2005  (JP) .................. 2005-356147

(51) Int. Cl.
   *F01N 3/00*  (2006.01)
(52) U.S. Cl. ............... 60/286; 60/295; 60/297; 60/301; 60/303
(58) Field of Classification Search .............. 60/278, 60/280, 286, 292, 295, 297, 301, 303
   See application file for complete search history.

(56) References Cited

U.S. PATENT DOCUMENTS

| | | | |
|---|---|---|---|
| 5,628,186 A | 5/1997 | Schmelz | |
| 5,884,476 A * | 3/1999 | Hirota et al. | 60/278 |
| 6,354,079 B1 * | 3/2002 | Choi et al. | 60/286 |
| 6,755,014 B2 * | 6/2004 | Kawai et al. | 60/286 |
| 6,871,490 B2 * | 3/2005 | Liang et al. | 60/286 |
| 7,272,924 B2 * | 9/2007 | Itoh et al. | 60/286 |
| 7,313,911 B2 * | 1/2008 | Pfeifer et al. | 60/286 |
| 7,614,218 B2 * | 11/2009 | Akagawa | 60/295 |

FOREIGN PATENT DOCUMENTS

| | | |
|---|---|---|
| DE | 199 01 915 C1 | 4/2000 |
| EP | 0 839 996 A2 | 5/1998 |
| JP | 8-509795 A | 10/1996 |
| JP | 2003-293737 A | 10/2003 |
| JP | 2003-343241 A | 12/2003 |

OTHER PUBLICATIONS

Office Action U.S. Appl. No. 10 2006 057 325.0-13 issued in corresponding German Patent Application dated Jun. 29, 2009. Partial translation provided.
Notification of Reasons for Rejection issued in corresponding Japanese Patent Application No. 2005-356147 dated Jun. 2, 2010.

* cited by examiner

*Primary Examiner* — Binh Q Tran
(74) *Attorney, Agent, or Firm* — Rossi, Kimms & McDowell LLP

(57) ABSTRACT

An exhaust gas purification device comprises a NOx catalyst for purifying NOx contained in exhaust gas by using ammonia as a reducing agent, an ammonia supply device for supplying ammonia to the NOx catalyst, a catalyst temperature sensor for detecting the internal temperature of the NOx catalyst, and a control unit that stops the ammonia supply from the ammonia supply device when the stop condition is satisfied that the internal temperature of the NOx catalyst becomes equal to or higher than first prescribed temperature in the process where ammonia is supplied from the ammonia supply device to the NOx catalyst.

11 Claims, 2 Drawing Sheets

EXHAUST GAS PURIFICATION DEVICE

BACKGROUND OF THE INVENTION

1. Field of the Invention

The present invention relates to an exhaust gas purification device for purifying the exhaust gas of an engine, and more specifically to an exhaust gas purification device having a NOx catalyst for reducing and purifying NOx contained in exhaust gas by using ammonia as a reducing agent.

2. Description of the Related Art

Exhaust gas purification devices for purifying NOx (nitrogen oxide) that is one of the pollutants contained in the exhaust gas discharged from an engine have been well known. To be more concrete, one of such exhaust gas purification devices is provided with a NOx catalyst of an ammonia selective reduction type in the exhaust path of the engine, and purifies the NOx contained in exhaust gas by supplying the NOx catalyst with ammonia serving as a reducing agent.

In this type of exhaust gas purification device, urea water is supplied to the upstream side of the NOx catalyst, and the ammonia created by the urea water being hydrolyzed due to exhaust heat is supplied to the NOx catalyst. The ammonia supplied to the NOx catalyst is adsorbed on the NOx catalyst for a while. A denitrifying reaction caused between the ammonia and the NOx contained in the exhaust gas is advanced by the NOx catalyst, and the NOx is thus purified.

For example, Unexamined Japanese Patent Publication No. 2003-343241 (hereinafter, referred to as Document 1) discloses an exhaust gas purification device of an engine having a NOx catalyst for purifying the NOx contained in exhaust gas by using ammonia as a reducing agent in the above-mentioned manner.

In order to efficiently purify NOx by using the NOx catalyst, it is required that a sufficient amount of ammonia should be adsorbed on the NOx catalyst.

The adsorbable amount of ammonia on the NOx catalyst tends to change in the decreasing direction as the temperature of the NOx catalyst increases. The ammonia adsorbed on the NOx catalyst is liable to desorb from the NOx catalyst along with the temperature rise. If the increase of the NOx catalyst temperature is relatively slow, the ammonia that has desorbed from the NOx catalyst is consumed as a reducing agent for reducing NOx. In contrast, if the NOx catalyst temperature is sharply raised, for example, by rapid acceleration of the engine, the ammonia that has desorbed from the NOx catalyst is also rapidly increased in amount. As a result, part of the ammonia flows out of the NOx catalyst together with the ammonia that has not been adsorbed on the NOx catalyst because of the temperature rise. This increases the amount of ammonia slip.

Therefore, if a sufficient amount of ammonia is adsorbed on the NOx catalyst for the purpose of efficiently purifying NOx, this incurs a large quantity of ammonia slip when the NOx catalyst temperature rapidly climbs. On the other hand, if the amount of ammonia to be supplied to the NOx catalyst is reduced to suppress such ammonia slip, this causes the problem that NOx cannot be efficiently purified.

The exhaust gas purification device disclosed in Document 1 stops the supply of urea water when the exhaust temperature drops. However, this does not prevent the ammonia slip that is increased as the NOx catalyst temperature rises, and would not be a solution for the problem.

Concerning the NOx catalyst using ammonia as a reducing agent, it is desirable that the NOx catalyst be supplied with ammonia of an amount corresponding to the amount of NOx which can be purified by the NOx catalyst, and that all the ammonia be used up for NOx purification. In fact, however, part of the supplied ammonia flows out of the NOx catalyst without contributing to NOx purification.

It is known that an oxidation catalyst is disposed downstream of the NOx catalyst for the purpose of preventing the ammonia that has flowed out of the NOx catalyst from escaping into the atmosphere.

The oxidation catalyst oxidizes the ammonia that has flowed out of the NOx catalyst, and transforms it into $N_2$ or NOx. The NOx produced here changes into $N_2$ due to the ammonia flowing into the oxidation catalyst. In this manner, the ammonia that has flowed out of the NOx catalyst is transformed into nonhazardous $N_2$ by the oxidation catalyst and is released into the atmosphere.

If such an oxidation catalyst is set downstream of the NOx catalyst, it is possible to prevent the ammonia from escaping into the atmosphere. On the other hand, this requires to secure a space for the oxidation catalyst, for example, in the case of an engine installed in a vehicle. There also arises a problem such as a cost increase because expensive noble metal is used as catalytic material for the oxidation catalyst.

If the efficient NOx purification takes precedence on the premise that ammonia slip is prevented by installing the oxidation catalyst, urea water has to be supplied more than required amount in order to compensate the ammonia lost through ammonia slip that is caused by the rise of the NOx catalyst temperature. For that reason, there is the problem that the cost is increased in proportion to the amount of the urea water additionally supplied.

SUMMARY OF THE INVENTION

An aspect of the present invention is directed to an exhaust gas purification device comprising a NOx catalyst that is interposed in an exhaust path of an engine and purifies NOx contained in exhaust gas by using ammonia as a reducing agent; ammonia supply means for supplying ammonia to the NOx catalyst; catalyst temperature detection means for detecting internal temperature of the NOx catalyst; and control means that stops ammonia supply from the ammonia supply means when a stop condition is satisfied that the temperature detected by the catalyst temperature detection means is equal to or higher than first prescribed temperature in the process where ammonia is supplied from the ammonia supply means to the NOx catalyst.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

An embodiment of the present invention will be described below with reference to the attached drawings.

Figure 1:
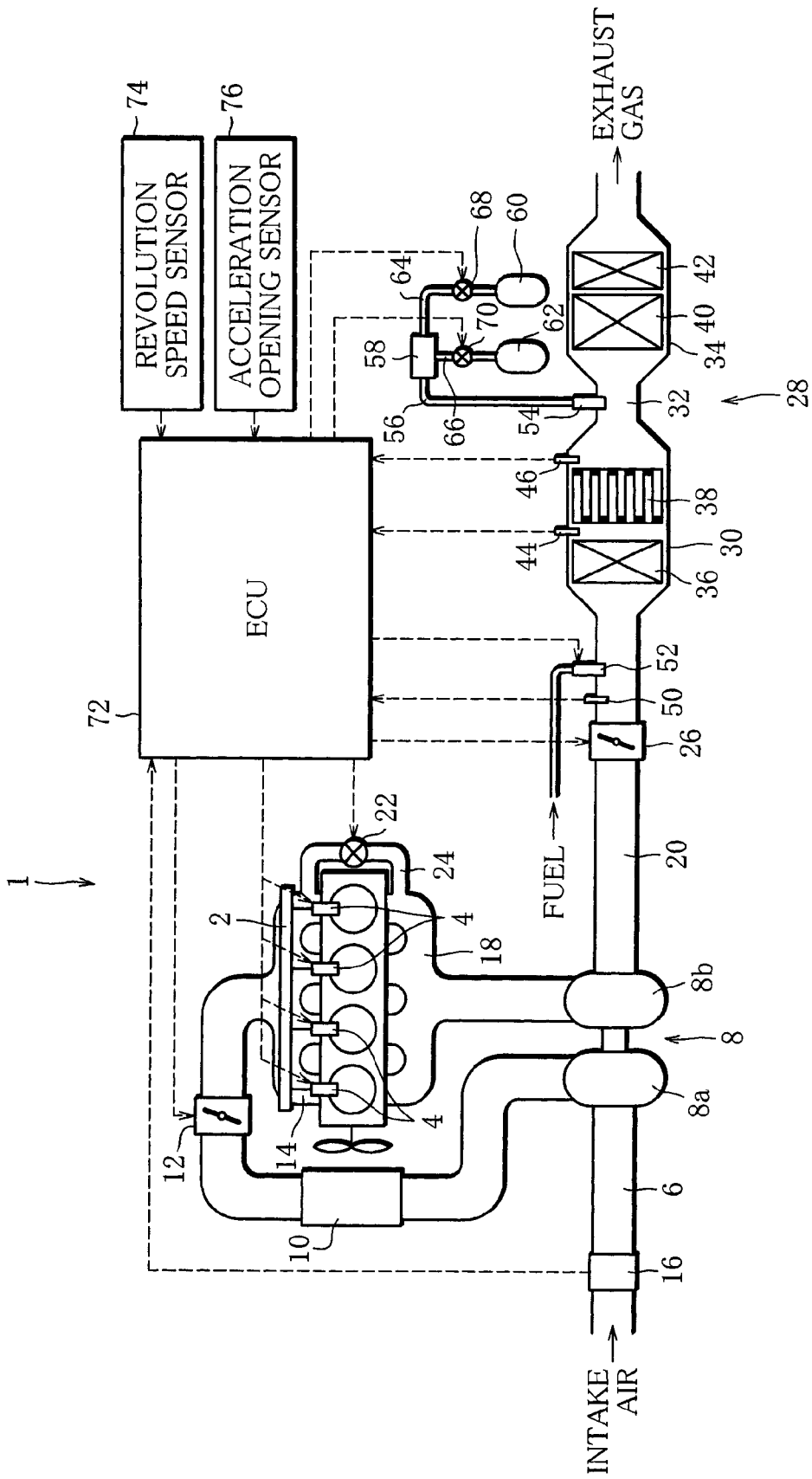
FIG. 1 is a view showing the overall structure of an exhaust gas purification device according to one embodiment of the present invention.

FIG. 1 shows a system structure of a four-cylinder diesel engine (hereinafter, referred to as an engine), to which an exhaust gas purification device according to one embodiment of the present invention is applied. A structure of the exhaust gas purification device according to the present invention will be described with reference to FIG. 1.

An engine 1 has a high-pressure accumulator (hereinafter, referred to as a common rail) 2 that is common to all cylinders. Light oil serving as high-pressure fuel, which is supplied from a fuel injection pump, not shown, to be accumulated in the common rail 2, is supplied to an injector 4 provided to each cylinder. The injectors 4 inject the light oil into their respective cylinders.

A turbocharger 8 is interposed in an intake path 6. Intake air that is sucked through an air cleaner, not shown, flows through the intake path 6 into a compressor 8a of the turbocharger 8. The intake air turbocharged by the compressor 8a is introduced to an intake manifold 14 via an intercooler 10 and an intake control valve 12. Disposed upstream from the compressor 8a of the intake path 6 is an intake flow rate sensor 16 for detecting a flow rate of the intake air introduced to the engine 1.

Exhaust ports, not shown, through which exhaust gas existing in the cylinders of the engine 1 is discharged, are connected to an exhaust pipe (exhaust path) 20 through an exhaust manifold 18. Interposed between the exhaust manifold 18 and the intake manifold 14 is an EGR path 24 connecting the exhaust manifold 18 and the intake manifold 14 to each other via an EGR valve 22.

The exhaust pipe 20 extends beyond a turbine 8b of the turbocharger 8 and is connected to an exhaust after-treatment device 28 through an exhaust throttle valve 26. A rotary shaft of the turbine 8b is interconnected to a rotary shaft of the compressor 8a. Upon receipt of the exhaust gas running through the exhaust pipe 20, the turbine 8b drives the compressor 8a.

The exhaust after-treatment device 28 includes an upstream casing 30 and a downstream casing 34 communicating with the downstream side of the upstream casing 30 through a communicating path 32. A pre-stage oxidation catalyst 36 is accommodated in the upstream casing 30 so as to be located on the upstream side thereof, and a particulate filter (hereinafter, referred to as a filter) 38 on the downstream side.

The pre-stage oxidation catalyst 36 oxidizes NO contained in the exhaust gas to transform it into $NO_2$, and then supplies the $NO_2$ to the filter 38 located downstream. The filter 38 is made up of a honeycomb ceramic carrier. In the filter 38, a lot of paths linking the upstream side to the downstream side are laid side by side, and an upstream opening and a downstream opening of each of the paths are alternately closed. The filter 38 traps particulates contained in the exhaust gas, to thereby purify the exhaust gas of the engine 1. The particulates trapped by and accumulated in the filter 38 are oxidized in reaction with the $NO_2$ supplied from the pre-stage oxidation catalyst 36, and are then removed from the filter 38. In this way, continuous regeneration of the filter 38 is carried out.

An ammonia selective reduction type NOx catalyst 40 is accommodated in the downstream casing 34 so as to be located on the upstream side thereof, and a post-stage oxidation catalyst 42 on the downstream side.

The NOx catalyst 40 selectively reduces the NOx contained in the exhaust gas by using ammonia as a reducing agent, to thereby purify the exhaust gas of the engine 1. Since the NO contained in the exhaust gas is transformed into $NO_2$ by the pre-stage oxidation catalyst 36, the NOx catalyst 40 is supplied mainly with the $NO_2$ that can be reduced more easily than NO.

The post-stage oxidation catalyst 42 oxidizes the ammonia that has flowed out of the NOx catalyst 40 and turns it into $N_2$.

The post-stage oxidation catalyst 42 also has a function of oxidizing CO produced when the particulates are burned in the process of after-mentioned forced regeneration of the filter 38. The CO is transformed into $CO_2$ by the post-stage oxidation catalyst and the $CO_2$ is discharged into the atmosphere.

In the upstream casing 30 of the exhaust after-treatment device 28 thus constructed, an upstream pressure sensor 44 for detecting exhaust pressure of the upstream side of the filter 38 is disposed before the filter 38 and a downstream pressure sensor 46 for detecting exhaust pressure of the downstream side of the filter 38 is disposed behind the filter 38.

Interposed in the exhaust pipe 20 extending between the exhaust throttle valve 26 and the exhaust after-treatment device 28 are an exhaust temperature sensor 50 for detecting the temperature of the exhaust gas that flows into the exhaust after-treatment device 28 and a fuel adding valve 52 that is supplied with fuel from a fuel injection pump, not shown, and injects the fuel into the exhaust gas located in the exhaust pipe 20.

The fuel adding valve 52 feeds HC to the pre-stage oxidation catalyst 36 by injecting the fuel into the exhaust gas when the forced regeneration of the filter 38 is required. As a result, the exhaust gas that has reached a high temperature due to the oxidation of the HC in the oxidation catalyst 36 is supplied to the filter 38, which raises the temperature of the filter 38.

Disposed in the communicating path 32 of the exhaust after-treatment device 28 is an injection nozzle (ammonia supply means) 54 for injecting urea water into the exhaust gas located in the communicating path 32. The injection nozzle 54 is connected to a urea water injection device 58 through a urea water injection pipe 56.

The urea water injection device 58 injects urea water into pressurized air and supplies the urea water to the injection nozzle 54 together with the pressurized air through the urea water injection pipe 56. The pressurized air is supplied to the urea water injection device 58 from an air tank 60 that stores the pressurized air compressed by an air pump, not shown, through an air supply pipe 64. The urea water is supplied by means of a urea water supply pump, not shown, to the urea water injection device 58 from a urea water tank 62 through a urea water supply pipe 66.

The air supply pipe 64 is provided with an air control valve 68. A supply amount of the pressurized air to the urea water injection device 58 is regulated by opening/closing the air control valve 68. A urea water control valve 70 is interposed in the urea water supply path 66. A supply amount of the urea water to the urea water injection device 58 is regulated by opening/closing the urea water control valve 70. In short, an injection supply amount of the urea water from the injection nozzle 54 into the exhaust gas is regulated by opening/closing the air control valve 68 and the urea water control valve 70.

The urea water injected from the injection nozzle 54 is hydrolyzed by exhaust heat and changes into ammonia to be supplied to the NOx catalyst 40. The NOx catalyst 40 adsorbs the supplied ammonia and encourages a denitrifying reaction between the adsorbed ammonia and the NOx contained in the exhaust gas. By so doing, the NOx catalyst 40 purifies and transforms the NOx into nonhazardous $N_2$.

The ammonia that has not reacted with the NOx and flowed out of the NOx catalyst 40 is oxidized by the post-stage oxidation catalyst 42, and turns into $N_2$ or NOx. The NOx produced here reacts with the ammonia that flows into the post-stage oxidation catalyst 42 to change into $N_2$. Therefore, the ammonia that flows into the post-stage oxidation catalyst 42 changes into nonhazardous $N_2$ and is released into the atmosphere.

An ECU (control means) 72 is a controller for conducting comprehensive control including operation control of the engine 1. The ECU 72 has a CPU (Central Processing Unit), memory units, timer units, etc. The ECU 72 calculates various control amounts and also controls devices of different sorts according to the control amounts.

In order to collect information required for various controls, sensors of different kinds are connected to an input side of the ECU 72, including a revolution speed sensor 74 for detecting engine revolution speed, an acceleration opening sensor 76 for detecting a gas-pedal depressing amount, etc., in addition to the intake flow rate sensor 16, the upstream pressure sensor 44, the downstream pressure sensor 46 and the exhaust temperature sensor 50. Connected to an output side of the ECU 72 are various kinds of devices including the injectors 4 of the cylinders, the intake control valve 12, the EGR valve 22, the exhaust throttle valve 26, the fuel adding valve 52, the air control valve 68, the urea water control valve 70 and the like, which are controlled according to the calculated control amounts.

The ECU 72 also calculates a fuel supply amount with respect to each of the cylinders of the engine 1, and controls the fuel supply from the injectors 4 according to the calculated fuel supply amount. The fuel supply amount (main injection amount) required for operation of the engine 1 is determined by being read out from a map previously stored, on the basis of the engine revolution speed detected by the revolution speed sensor 74 and the acceleration opening detected by the acceleration opening sensor 76. The amount of the fuel supplied to the cylinders is regulated according to valve-opening duration of the injectors 4. In other words, each of the injectors 4 is driven so that the corresponding valve is open for a drive duration corresponding to the determined fuel amount, and main injection is carried out with respect to each of the cylinders, which supplies the fuel of the amount required for the operation of the engine 1.

The ECU 72 obtains a urea water supply amount that is required to selectively reduce the NOx discharged from the engine 1 by means of the NOx catalyst 40. Concretely, based upon an operation condition of the engine, including the engine revolution speed detected by the revolution speed sensor 74, the main fuel injection amount, etc., the ECU 72 finds the necessary urea water supply amount from map data previously stored. The ECU 72 opens/closes the air control valve 68 and the urea water control valve 70 according to the urea water supply amount thus obtained.

In the urea water injection device 58, the urea water that is regulated in supply amount by the urea water control valve 70 is mixed with the pressurized air that is regulated in supply amount by the air control valve 68. A mixture of the urea water and the pressurized air is injected from the injection nozzle 54 into the exhaust gas located in the communicating path 32. The urea water thus injected is hydrolyzed by exhaust heat to turn into ammonia, and is adsorbed on the NOx catalyst 40. The NOx catalyst 40 promotes the denitrifying reaction between the adsorbed ammonia and the NOx contained in the exhaust gas. As a result, the NOx in the exhaust gas changes into nonhazardous $N_2$. The ammonia that has not been adsorbed on the NOx catalyst and directly flows out during the foregoing process is transformed into nonhazardous $N_2$ by the post-stage oxidation catalyst 42 and released into the atmosphere as described above. In the exhaust gas purification device thus constructed, the exhaust gas discharged from the engine 1 runs through the exhaust pipe 20 to be introduced to the exhaust after-treatment device 28, and the particulates contained in the exhaust gas are trapped by the filter 38. At this moment, through the continuous regeneration using the $NO_2$ supplied from the pre-stage oxidation catalyst 36, the particulates accumulated in the filter 38 are oxidized and removed from the filter 38 as mentioned above.

In some cases, during an operation condition in which the exhaust temperature of the engine 1 is low, for example, during a low-speed and low-load operation, the exhaust temperature does not rise up to activation temperature of the pre-stage oxidation catalyst 36, so that the NO contained in the exhaust gas is not oxidized. Consequently, the continuous regeneration of the filter 38 is not satisfactorily performed. If this condition continues, there is the fear that the particulates are excessively accumulated in the filter 38 and clog the filter 38. Therefore, the forced regeneration of the filter 38 is carried out by properly raising the temperature of the filter 38 according to the accumulation state of the particulates in the filter 38.

The forced regeneration of the filter 38 is performed on the basis of a judgment about the accumulation state of the particulates in the filter 38 from values detected by the upstream pressure sensor 44 and the downstream pressure sensor 46.

First, when the pre-stage oxidation catalyst 36 is not activated, the exhaust temperature is increased by controlling the intake control valve 12 and the exhaust throttle valve 26 in closing directions. The high-temperature exhaust gas is supplied to the pre-stage oxidation catalyst 36, to thereby activate the pre-stage oxidation catalyst 36. At this moment, if necessary, fuel is supplied into the exhaust gas from the fuel adding valve 52 and burned in the high-temperature exhaust gas. By doing this, the activation of the pre-stage oxidation catalyst 36 is promoted.

After the pre-stage oxidation catalyst 36 is activated, HC of the fuel that has been supplied into the exhaust gas from the fuel adding valve 52 is oxidized by the pre-stage oxidation catalyst 36. By so doing, the temperature of the exhaust gas that flows into the filter 38 is further increased, and the particulates accumulated in the filter 38 are burned.

The purification of the NOx contained in the exhaust gas by using the NOx catalyst 40 is performed by selectively reducing the NOx in the exhaust gas by using as a reducing agent the ammonia produced from the urea water that is supplied into the exhaust gas from the injection nozzle 54 as described.

Figure 2:
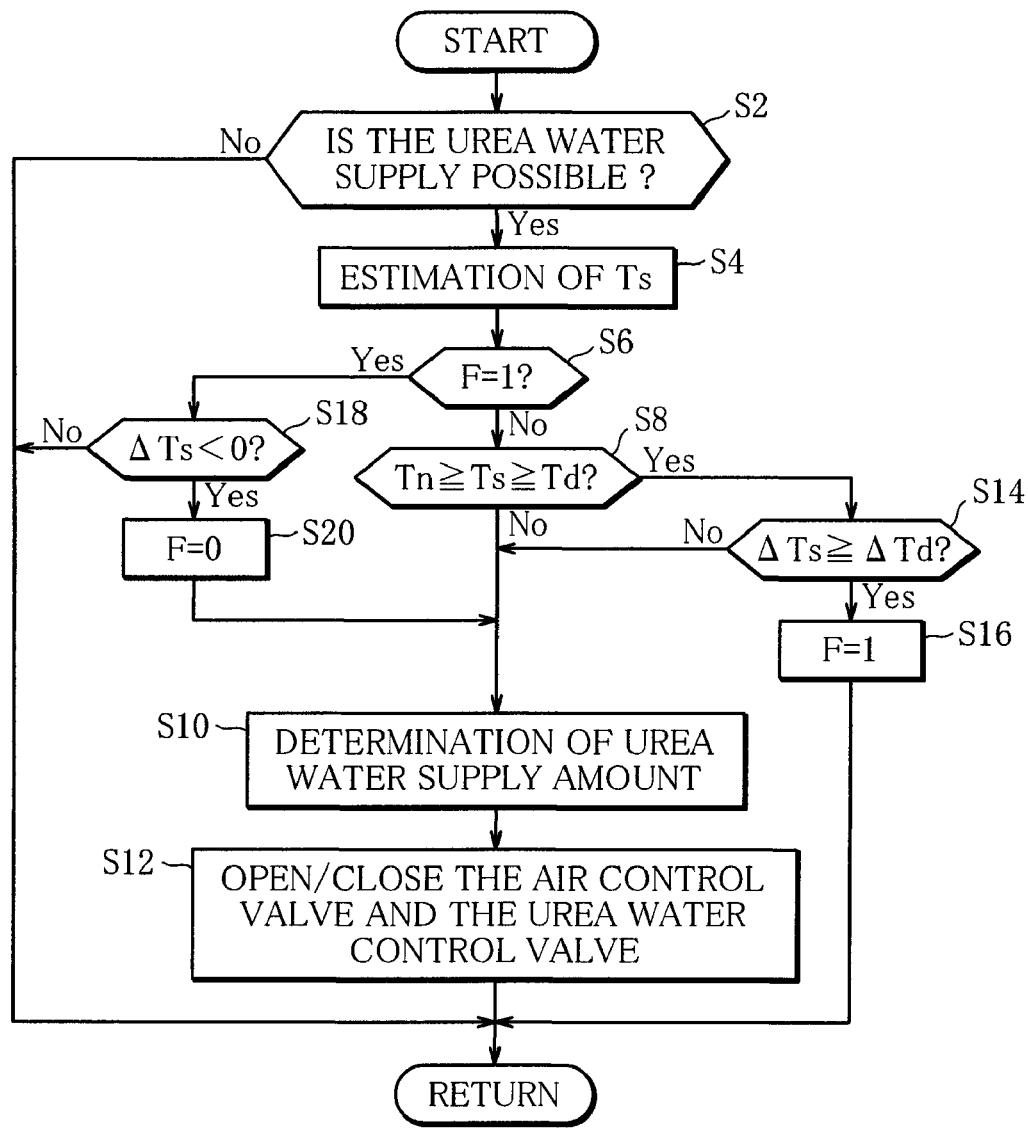
FIG. 2 is a flowchart of urea water supply control that is conducted by the exhaust gas purification device of FIG. 1.

The urea water supply control here is implemented by the ECU 72 in a prescribed control cycle according to a flowchart of FIG. 2 once the engine 1 is started.

First, in Step S2, it is determined whether it is possible to supply the urea water into the exhaust gas. For instance, when the NOx catalyst 40 has not reached the activation temperature as in right after the start up of the engine 1 or when the exhaust temperature has not reached temperature that enables the hydrolysis of the urea water or the like, it is impossible to purify NOx using ammonia as a reducing agent. Therefore, the urea water should not be supplied into the exhaust gas. Accordingly, in Step S2, a determination is made as to whether the engine 1 is in a suitable condition for the urea water supply, on the basis of an operation condition of the engine, such as exhaust temperature of the input side of the exhaust after-treatment device 28, which is detected by the exhaust temperature sensor 50.

If it is determined in Step S2 that the urea water supply is inappropriate, the current control cycle is ended, and the procedure is carried out from Step S2 again in the next control cycle. The following description, however, is provided on the premise that the engine 1 is in the operation condition that is suitable for the urea water supply.

If it is determined in Step S2 that the urea water supply is appropriate, the procedure continues to Step S4. In Step S4, internal temperature Ts of the NOx catalyst 40 is detected from estimation based upon the exhaust temperature in the input side of the exhaust after-treatment device 28, which is detected by the exhaust temperature sensor 50. Therefore, the ECU 72 corresponds to catalyst temperature detection means of the present invention.

More specifically, internal temperature Ts of the NOx catalyst 40 is detected as described below. First, engine torque is obtained from the gas-pedal depressing amount that is detected by the acceleration opening sensor 76 and the engine revolution speed detected by the revolution speed sensor 74. Secondly, based upon the engine torque and the engine revolution speed, an exhaust flow rate of the NOx catalyst 40 is obtained. Using the exhaust flow rate of the NOx catalyst 40, a heat capacity of a carrier of the NOx catalyst 40, and the exhaust temperature that is detected by the exhaust temperature sensor 50, the quantity of heat supplied to the NOx catalyst 40 and the quantity of heat removed from the NOx catalyst 40 are calculated. Based upon difference between these quantities of heat, the internal temperature Ts of the NOx catalyst 40 is obtained. On the basis of a value of the internal temperature Ts of the NOx catalyst 40, which has been obtained here, the ECU 72 calculates changing rate ΔTs of the internal temperature Ts as well.

The procedure advances to Step S6, in which it is determined whether a value of a supply stop flag F is "1". The supply stop flag F indicates as to whether the urea water supply from the injection nozzle 54 should be discontinued. A value of "1" indicates stop of the supply, whereas a value of "0" means that the supply is allowed. An initial value of the supply stop flag F is "0", and the procedure advances from Step S6 to Step SB this time.

In Step S8, it is determined whether the internal temperature Ts of the NOx catalyst 40, which has been detected in Step S4, is equal to or higher than first prescribed temperature Td, and simultaneously is equal to or lower than second prescribed temperature Tn that is higher than the first prescribed temperature Td.

The first prescribed temperature Td corresponds to desorption start temperature at which the ammonia adsorbed on the NOx catalyst 40 starts desorbing from the NOx catalyst 40 due to a temperature rise of the NOx catalyst 40. In other words, the ammonia adsorbed on the NOx catalyst 40 starts desorbing from the NOx catalyst 40 when the internal temperature of the NOx catalyst 40 exceeds the desorption start temperature.

The second prescribed temperature Tn corresponds to adsorption limit temperature that is an upper limit of a temperature range in which ammonia can be adsorbed on the NOx catalyst 40. Specifically, an ammonia adsorption amount is reduced as temperature increases, and when the internal temperature of the NOx catalyst 40 exceeds the adsorption limit temperature, the NOx catalyst 40 becomes incapable of adsorbing ammonia.

If it is determined in Step S8 that the internal temperature Ts of the NOx catalyst 40 falls in the above-mentioned temperature range, the procedure moves to Step S14. In contrast, if it is determined that the internal temperature Ts is not within the temperature range, the procedure advances to Step S10.

Ammonia slip occurs when the ammonia adsorbed on the NOx catalyst 40 desorbs from the NOx catalyst 40 due to the temperature rise of the NOx catalyst 40. For that reason, it is concluded that there is no chance of ammonia slip in such a temperature range that the ammonia does not desorb from the NOx catalyst 40 (temperature range that is lower than the desorption start temperature) and in such a temperature range that the ammonia is not adsorbed on the NOx catalyst 40 (temperature range that is higher than the adsorption limit temperature). Therefore, the procedure advances to Step S10, in which the supply amount of the urea water supplied from the injection nozzle 54 is determined.

In Step S10, the amount of urea water to be supplied is found, according to the amount of ammonia required to purify the NOx contained in the exhaust gas by using the NOx catalyst 40. Concretely, a NOx exhaust amount that is discharged from the engine 1 is estimated based on the operation condition of the engine, including the engine revolution speed that have been detected by the revolution speed sensor 74 and the main fuel injection amount that has been calculated by the ECU 72. At the same time, based upon the internal temperature Ts of the NOx catalyst 40, a NOx purification rate of the NOx catalyst 40 is obtained from a map that is previously stored. A purification amount of NOx that is purified by the NOx catalyst 40 is obtained from the estimated NOx exhaust amount and the NOx purification rate, and an ammonia amount corresponding to the purification amount of NOx is obtained. Based upon the ammonia amount thus obtained, the required urea water supply amount is obtained.

When the procedure advances from Step S10 to Step S12, the air control valve 68 and the urea water control valve 70 are opened/closed so that the urea water in the amount obtained in Step S10 is injected into the exhaust gas from the injection nozzle 54. Accordingly, the urea water is injected from the injection nozzle 54 into the exhaust gas located in the communicating path 32 together with the pressurized air.

The urea water injected from the injection nozzle 54 is hydrolyzed by exhaust heat, which produces ammonia. This ammonia is supplied to the NOx catalyst 40, and the denitrifying reaction between the NOx contained in the exhaust gas and the ammonia is promoted by the NOx catalyst 40. In this manner, the NOx contained in the exhaust gas is selectively reduced and transformed into nonhazardous $N_2$.

After the urea water is supplied in Step S12 as described above, the current control cycle is ended. The procedure then continues from Step S2 again in the next control cycle.

In the subsequent control cycles, too, as long as the internal temperature Ts of the NOx catalyst 40 is lower than the first prescribed temperature Td or higher than the second prescribed temperature Tn, the procedure advances from Step S8 to Steps S10 and S12, to thereby supply the urea water from the injection nozzle 54.

If it is determined in Step S8 that the internal temperature Ts of the NOx catalyst 40 is equal to or higher than the first prescribed temperature Td and equal to or lower than the second prescribed temperature Tn, the internal temperature Ts falls in such a temperature range that the ammonia can be adsorbed on the NOx catalyst 40, and the ammonia adsorbed on the NOx catalyst 40 desorbs from the NOx catalyst 40.

Ammonia slip occurs when the ammonia adsorbed on the NOx catalyst 40 desorbs from the NOx catalyst 40 due to the temperature rise of the NOx catalyst 40. Accordingly, when the internal temperature Ts of the NOx catalyst 40 is within such a temperature range, there is the possibility of ammonia slip.

In this case, the procedure advances to Step S14, in which it is determined whether the changing rate ΔTs of the internal temperature Ts, which has been obtained from the internal temperature Ts of the NOx catalyst 40 detected in Step S4, is equal to or higher than a prescribed value ΔTd.

Along with the increase of the internal temperature of the NOx catalyst 40, the ammonia adsorbed on the NOx catalyst 40 desorbs from the NOx catalyst 40. However, if the temperature increases relatively slowly, the ammonia also desorbs from the NOx catalyst 40 slowly as well. Therefore, the ammonia that has desorbed from the NOx catalyst 40 is consumed as a reducing agent to selectively reduce NOx. Consequently, the possibility of ammonia slip is low. In contrast, if the internal temperature of the NOx catalyst 40 sharply climbs, the amount of the ammonia that desorbs from the NOx catalyst 40 also sharply increases. Not all the ammonia that has desorbed from the NOx catalyst 40 is consumed as a reducing agent, which results in ammonia slip.

Given this situation, temperature rise speed that causes such ammonia slip is previously checked through an experiment or the like, and the prescribed value $\Delta Td$ is determined on the basis of a check result and is used in Step S14.

If the changing rate $\Delta Ts$ of the internal temperature of the NOx catalyst 40 is lower than the prescribed value $\Delta Td$, it is determined in Step S14 that the possibility of ammonia slip is low. The procedure then moves to Step S10 and further to Step S12, thereby supplying the urea water from the injection nozzle 54 as stated above.

If it is determined in Step S14 that the changing rate $\Delta Ts$ of the internal temperature of the NOx catalyst 40 is equal to or higher than the prescribed value $\Delta Td$, ammonia slip is considered highly possible. The procedure then continues to Step S16, in which the value of the supply stop flag F is set to "1" and the current control cycle is ended. In this case, therefore, the urea water supply from the injection nozzle 54 is not carried out.

In this manner, the urea water supply is cancelled without fail if there is a high possibility of ammonia slip.

In the next control cycle, the internal temperature Ts of the NOx catalyst 40 is detected from inlet-side exhaust temperature of the exhaust after-treatment device 28 again in Step S4. Subsequently, in Step S6, a determination is made as to whether the value of the supply stop flag F is "1".

Since the value of the supply stop flag F is set to "1" in Step S16 in the previous control cycle, the procedure advances to Step S18 here.

In Step S18, it is determined whether the changing rate $\Delta Ts$ of the internal temperature Ts, which has been obtained from the internal temperature Ts of the NOx catalyst 40 detected in Step S4, is a negative value, that is, whether the internal temperature Ts changes in the decreasing direction.

As mentioned above, one of the factors in causing ammonia slip is that, due to the increase of the internal temperature of the NOx catalyst 40, the ammonia adsorbed on the NOx catalyst 40 desorbs from the NOx catalyst 40. This leads to a determination that the possibility of such ammonia slip is low when the internal temperature of the NOx catalyst 40 changes in the decreasing direction. Accordingly, if it is determined in Step S18 that the changing rate $\Delta Ts$ of the internal temperature Ts of the NOx catalyst 40 has a negative value, the value of the supply stop flag F is set to "0" in Step S20. The procedure then moves to Step S10 and further to Step S12, in which the supply of the urea water from the injection nozzle 54 is resumed.

When the urea water supply is resumed as described, in the next control cycle, the internal temperature Ts of the NOx catalyst 40 is detected in Step S4 again, and then it is determined in Step S6 whether the value of the supply stop flag F is "1". The value of the supply stop flag F is set to "0" in Step S20, so that the procedure advances to Step S8.

After the urea water supply is resumed, the urea water continues to be supplied from the injection nozzle 54 until it is determined in Step S8 that the internal temperature Ts of the NOx catalyst 40 falls in the temperature range that is defined by the first prescribed temperature Td and the second prescribed temperature Tn and it is determined in Step S14 that the changing rate $\Delta Ts$ of the internal temperature Ts of the NOx catalyst 40 is equal to or higher than the prescribed value $\Delta Td$.

If it is determined in Step S18 that the changing rate $\Delta Ts$ of the internal temperature Ts of the NOx catalyst 40 is equal to or higher than zero, it is concluded that the possibility of ammonia slip is still high. Therefore, the current control cycle is ended without supplying the urea water.

Accordingly, after the urea water supply from the injection nozzle 54 is stopped, the urea water supply remains suspended until the changing rate $\Delta Ts$ of the internal temperature Ts of the NOx catalyst 40 becomes a negative value.

By performing the above-described urea water supply control, the urea water supply from the injection nozzle 54 is stopped when the internal temperature Ts of the NOx catalyst 40 falls in the temperature range that incurs the ammonia adsorption and desorption on and from the NOx catalyst 40, which are factors in causing ammonia slip, and simultaneously the changing rate $\Delta Ts$ of the internal temperature Ts, or a temperature rise rate of the internal temperature Ts, is so sharp that ammonia slip occurs.

Since the urea water supply is stopped according to accurate judgment of such a state that ammonia slip is highly likely to occur, it is possible to reliably prevent ammonia slip. Furthermore, the urea water is supplied when the possibility of ammonia slip is low, so that the urea water supply is not stopped more than requires, and the NOx purification can be adequately carried out. Consequently, the efficiency of the NOx purification is enhanced.

Since ammonia slip is prevented by the urea water supply control, if the post-stage oxidation catalyst 42 is placed downstream of the NOx catalyst 40 as in the present embodiment, it is possible to reduce the amount of noble metal that the post-stage oxidation catalyst 42 carries. This reduces a cost of the exhaust gas purification device.

In order to secure the efficiency of the NOx purification performed by the NOx catalyst 40 in the situation where ammonia slip frequently occurs, it is required to supply extra urea water in consideration of the amount of ammonia slip. If ammonia slip is prevented as described in the present embodiment, extra urea water can be reduced, and it is possible to cut down the amount of urea water consumption.

The description of the exhaust gas purification device according to one embodiment of the present invention is finished here, but the present invention is not limited to the above-described embodiment.

For instance, according to the embodiment, the internal temperature Ts of the NOx catalyst 40 is estimated from the inlet-side exhaust temperature of the exhaust after-treatment device 28, which has been detected by the exhaust temperature sensor 50. Instead of doing so, however, a temperature sensor may be directly installed in the inside of the NOx catalyst 40 as catalyst-temperature detection means.

This makes it possible to detect the internal temperature of the NOx catalyst 40 with higher accuracy. On the other hand, the embodiment is capable of detecting a rise in the internal temperature of the NOx catalyst 40 before the internal temperature actually increases, according to the estimation based upon the exhaust temperature detected in the upstream side of the NOx catalyst 40. Consequently, response of the urea water supply control can be improved.

Moreover, in the embodiment, the fuel addition is carried out by means of the fuel adding valve 52 when the filter 38 is forcedly regenerated so that the pre-stage oxidation catalyst 36 and the filter 38 are increased in temperature. Alternatively, it is also possible to provide additional fuel injection from the injectors 4 by carrying out post-injection besides the main injection.

According to the embodiment, the filter 38 is disposed within the upstream casing 30, and the NOx catalyst 40 within the downstream casing 34. However, the filter 38 may be placed upstream or downstream of the NOx catalyst 40 within the downstream casing 34. Moreover, the filter 38 does not necessarily have to be provided.

In the embodiment, the injection nozzle 54 for supplying the urea water is interposed in the communicating path 32. If the location of the filter 38 is changed as mentioned above, however, the injection nozzle 54 may be either interposed in the communicating path 32 as in the embodiment or disposed upstream of the NOx catalyst 40 in the downstream casing 34.

Although the exhaust after-treatment device 28 is constructed in two elements, namely the upstream casing 30 and the downstream casing 34, it is also possible to dispose the pre-stage oxidation catalyst 36, the filter 38, the NOx catalyst 40 and the post-stage oxidation catalyst 42 within a single casing.

The embodiment supplies ammonia to the NOx catalyst 40 by supplying urea water from the injection nozzle 54. However, actual ammonia may be directly supplied to the NOx catalyst by using the injection nozzle 54 or another means. Alternatively, instead of urea water, material that can be transformed into ammonia in exhaust gas may be supplied into the exhaust gas.

Lastly, although the embodiment is made by applying the present invention to an exhaust gas purification device of a diesel engine, the type of engine is not limited to this. Any types of engines are applicable as long as they have a NOx catalyst of an ammonia selective reduction type and means for supplying ammonia to the NOx catalyst.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An exhaust gas purification device comprising:
a NOx catalyst that is interposed in an exhaust path of an engine and purifies NOx contained in exhaust gas by using ammonia as a reducing agent;
ammonia supply means for supplying ammonia to the NOx catalyst;
catalyst temperature detection means for detecting internal temperature of the NOx catalyst; and
control means that stops ammonia supply from the ammonia supply means when a stop condition is satisfied that the temperature detected by the catalyst temperature detection means is equal to or higher than first prescribed temperature in the process where ammonia is supplied from the ammonia supply means to the NOx catalyst,
wherein the catalyst temperature detection means calculates the quantity of heat supplied to the NOx catalyst and the quantity of heat removed from the NOx catalyst using the exhaust flow rate of the NOx catalyst, a heat capacity of a carrier of the NOx catalyst and the exhaust temperature, and obtains the internal temperature of the NOx catalyst based upon a difference between these quantities of heat.

2. The exhaust gas purification device according to claim 1, wherein:
the first prescribed temperature is set on the basis of desorption start temperature at which the ammonia adsorbed on the NOx catalyst starts desorbing from the NOx catalyst due to a temperature rise of the NOx catalyst.

3. The exhaust gas purification device according to claim 1, wherein:
the stop condition further includes changing rate of internal temperature of the NOx catalyst, which is equal to or higher than a prescribed value.

4. The exhaust gas purification device according to claim 3, wherein:
the stop condition further includes the internal temperature of the NOx catalyst, which is equal to or lower than second prescribed temperature that is higher than the first prescribed temperature.

5. The exhaust gas purification device according to claim 4, wherein:
the second prescribed temperature is set on the basis of adsorption limit temperature that is an upper limit of a temperature range in which ammonia can be adsorbed on the NOx catalyst.

6. The exhaust gas purification device according to claim 3, wherein:
after stopping the ammonia supply from the ammonia supply means when the stop condition is satisfied, the control means resumes the ammonia supply from the ammonia supply means when an internal temperature change of the NOx catalyst is in the decreasing direction.

7. An exhaust gas purification device comprising:
a NOx catalyst that is interposed in an exhaust path of an engine and purifies NOx contained in exhaust gas by using ammonia as a reducing agent;
ammonia supply means for supplying ammonia to the NOx catalyst;
catalyst temperature detection means for detecting internal temperature of the NOx catalyst; and
control means that stops ammonia supply from the ammonia supply means when a stop condition is satisfied that the temperature detected by the catalyst temperature detection means is equal to or higher than first prescribed temperature and equal to or lower than second prescribed temperature that is higher than the first prescribed temperature in the process where ammonia is supplied from the ammonia supply means to the NOx catalyst.

8. The exhaust gas purification device according to claim 7, wherein:
the first prescribed temperature is set on the basis of desorption start temperature at which the ammonia adsorbed on the NOx catalyst starts desorbing from the NOx catalyst due to a temperature rise of the NOx catalyst.

9. The exhaust gas purification device according to claim 7, wherein:
the stop condition further includes changing rate of internal temperature of the NOx catalyst, which is equal to or higher than a prescribed value.

10. The exhaust gas purification device according to claim 7, wherein:
the second prescribed temperature is set on the basis of adsorption limit temperature that is an upper limit of a temperature range in which ammonia can be adsorbed on the NOx catalyst.

11. The exhaust gas purification device according to claim 9, wherein:
after stopping the ammonia supply from the ammonia supply means when the stop condition is satisfied, the control means resumes the ammonia supply from the ammonia supply means when an internal temperature change of the NOx catalyst is in the decreasing direction.

* * * * *